(12) United States Patent
Haverinen et al.

(10) Patent No.: US 8,095,179 B2
(45) Date of Patent: Jan. 10, 2012

(54) PROXY SMART CARD APPLICATIONS

(75) Inventors: Henry Haverinen, Jyuüskylä (FI); Pasi Eronen, Helsinki (FI)

(73) Assignee: Nokia Corporation, Espoo (FI)

( * ) Notice: Subject to any disclaimer, the term of this patent is extended or adjusted under 35 U.S.C. 154(b) by 350 days.

(21) Appl. No.: 10/965,643

(22) Filed: Oct. 14, 2004

(65) Prior Publication Data

US 2006/0092953 A1    May 4, 2006

(51) Int. Cl.
*H04M 1/00* (2006.01)
*H04B 1/38* (2006.01)
*G06F 3/00* (2006.01)
*G06F 15/16* (2006.01)

(52) U.S. Cl. ............... 455/556.1; 455/558; 719/330; 709/203

(58) Field of Classification Search ............ 455/466, 455/558, 503, 418–420, 569.2, 575.9, 556.1; 379/211.05; 719/330; 709/203
See application file for complete search history.

(56) References Cited

U.S. PATENT DOCUMENTS

| | | | | |
|---|---|---|---|---|
| 6,547,150 B1 * | 4/2003 | Deo et al. | | 235/492 |
| 6,557,753 B1 * | 5/2003 | Beaujard et al. | | 235/375 |
| 6,571,112 B1 * | 5/2003 | Ramaswamy | | 455/466 |
| 6,676,022 B1 * | 1/2004 | Guthery et al. | | 235/492 |
| 6,807,561 B2 * | 10/2004 | Lagosanto et al. | | 709/203 |
| 2002/0083142 A1 | 6/2002 | Lagosanto et al. | | |
| 2002/0151295 A1 * | 10/2002 | Boss et al. | | 455/412 |
| 2002/0162021 A1 * | 10/2002 | Audebert et al. | | 713/201 |
| 2002/0193129 A1 * | 12/2002 | Michaels et al. | | 455/466 |
| 2004/0042604 A1 * | 3/2004 | Hiltunen et al. | | 379/211.05 |
| 2004/0076131 A1 * | 4/2004 | Qu et al. | | 370/335 |
| 2004/0154027 A1 * | 8/2004 | Vandewalle et al. | | 719/330 |
| 2004/0162105 A1 * | 8/2004 | Reddy et al. | | 455/551 |
| 2004/0178261 A1 * | 9/2004 | Potonniee et al. | | 235/380 |
| 2004/0193891 A1 | 9/2004 | Ollila | | |
| 2005/0021600 A1 * | 1/2005 | Lagosanto et al. | | 709/203 |
| 2005/0125502 A1 * | 6/2005 | Fambon et al. | | 709/213 |
| 2005/0182738 A1 * | 8/2005 | Prouvost et al. | | 706/46 |
| 2005/0289341 A1 * | 12/2005 | Ritola et al. | | 713/168 |
| 2006/0059341 A1 * | 3/2006 | Dharmadhikari et al. | | 713/168 |

FOREIGN PATENT DOCUMENTS

| | | |
|---|---|---|
| CN | 1449214 | 10/2003 |
| FR | 2857207 | 1/2005 |
| GB | 2370659 | 3/2002 |
| KR | 2002-0051127 | 6/2002 |
| WO | WO 2005107166 | 11/2005 |

OTHER PUBLICATIONS

Korean office action and English Translation, Jul. 30, 2010.
European office action, Dec. 8, 2010.

(Continued)

*Primary Examiner* — George Eng
*Assistant Examiner* — Nam Huynh
(74) *Attorney, Agent, or Firm* — AlbertDhand LLP

(57) ABSTRACT

A system and method for the implementation of a proxy smart card application in a mobile telephone. The mobile telephone receives a smart card related message from a remote terminal. If the smart card related message is related to a function implemented by electronic device software within the mobile telephone, the electronic device software processes the message. If the smart card related message is not related to a function implemented by the electronic device software, the message is transmitted to the smart card.

39 Claims, 5 Drawing Sheets

OTHER PUBLICATIONS

Ericsson, "Split WLAN UE: Termination of EAP-AKA/SIM Protocol." 3GPP Draft; Feb. 3, 2004, pp. 1-8.

Siemens, "Pseudo-CR to TS 33.234 on Requirements on UE split." 3GPP Draft, Nov. 12, 2003, pp. 1-3.

3GPP SA3, "SIM Access Profile in Split WLAN-UESIM Access Profile in split WLAN-UE." 3GPP Draft, Nov. 21, 2003, pp. 1-2.

3GPP, 3GPP TS 33.234 V6,1,0 (Jun. 2004)—$3^{rd}$ Generation Partnership Project; Technical Specification Group Service and System Aspects; 3G Security; Wireless Local Area Network (WLAN) interworking security, Jun. 1, 2004, pp. 1-67.

Supplementary European Search Report for EP Application EP 05 85 0094, Mar. 3, 2009.

\* cited by examiner

PROXY SMART CARD APPLICATIONS

FIELD OF THE INVENTION

The present invention relates generally to networking systems. More particularly, the invention is related to 3GPP-Wireless LAN interworking, EAP SIM and EAP AKA authentication and split user equipment usage scenarios.

BACKGROUND OF THE INVENTION

New wireless LAN standards IEEE 802.11i and Wi-Fi Protected Access (WPA) use Extensible Authentication Protocol (EAP) for network access authentication and key agreement. In this situation, the wireless LAN station implements an EAP peer, which communicates with an EAP server implementation on the network side. During the EAP authentication exchange, the EAP peer and the EAP server exchange EAP packets. The EAP authentication server is usually a backend element which is separate from the wireless LAN access point. EAP has been designed to easily support several different authentication algorithms so that a separate EAP method implementation can be used for each authentication algorithm.

A new 3GPP Wireless LAN interworking standard enables a wireless LAN terminal to use the 3GPP smart card based authentication mechanisms for wireless LAN network access authentication. In the basic case, a single piece of user equipment is equipped with both the smart card and the wireless LAN interface. The wireless LAN terminal uses the Extensible Authentication Protocol method for GSM Subscriber Identity Modules (EAP-SIM) or the Extensible Authentication Protocol for 3G Authentication and Key Agreement (EAP-AKA) protocols to perform network access authentication. These protocols require access to the smart card of the device. Smart cards are widely used in portable electronics devices and are discussed in detail in UK Patent No. 2,370,659, assigned to Nokia Corporation and incorporated herein by reference.

In split user equipment (UE) situations, the wireless LAN network interface and the smart card reside in separate pieces of equipment. Typically in this case, a laptop equipped with a wireless LAN interface uses a mobile telephone, equipped with a smart card, for EAP-SIM and EAP-AKA authentication. As discussed above, these protocols require access to a smart card located on the mobile telephone. The laptop uses a Bluetooth connection to the mobile telephone in order to access the smart card for the wireless LAN authentication. Other possible communication connections could also be used to connect the laptop to the mobile telephone, such as RFID, WLAN (802.11x), infrared, UWB, or even a cabled connection such as a serial, parallel, or USB cable.

In the split UE case, there are three different ways to implement the EAP peer for EAP-SIM and EAP-AKA protocols. In the first implementation, the laptop implements the EAP peer and only uses the mobile phone for the smart card operations. In this scenario, EAP packets received from the wireless LAN network are processed by the laptop, and the laptop also generates all EAP packets that need to be transmitted to the network.

In the second implementation, the EAP-SIM and EAP-AKA peers are implemented by the mobile phone. The laptop passes through EAP packets from its wireless LAN interface to the mobile phone, and the mobile phone processes the EAP packets. The mobile phone uses the smart card for 3GPP authentication primitives only. The mobile phone generates the EAP packets that are to be transmitted to the wireless LAN network and sends them to the laptop. The laptop then forwards the outgoing EAP packets to the network.

In the third implementation, the smart card implements the EAP-SIM and EAP-AKA peers. In this case, special EAP capable smart cards are used. The laptop passes through EAP packets from its wireless LAN interface to the mobile phone, which again passes the EAP packet to the special smart card for processing. The smart card processes incoming EAP packets and generates outgoing EAP packets. The smart card passes its outgoing EAP packets to the mobile phone which further passes them to the laptop. The laptop then transmits the EAP packets to the wireless LAN network.

In 3GPP standardization, it is desired that the Bluetooth SIM Access Profile (SAP) be used in the split user equipment scenario. However, SAP is a low-level interface for accessing the smart card over a Bluetooth connection. SAP contains operations for exchanging application protocol data units (APDU), so it assumes that the smart card, rather than the mobile telephone, performs all the processing. This implies that if APDUs were used to send EAP packets to the mobile telephone, the EAP SIM and EAP AKA protocols would have to be implemented by the smart card.

It is currently desirable to implement EAP methods on the smart card, and they have product plans for special EAP smart cards. However, it may also be desirable for EAP methods to be implemented by the mobile telephone.

SUMMARY OF THE INVENTION

The present invention resolves the above issues by having the EAP SIM and EAP AKA protocols implemented by the mobile telephone, even when a low-level interface such as Bluetooth SAP is being used. The laptop computer sends EAP requests to the mobile telephone over a Bluetooth connection, and the mobile telephone sends the EAP responses back to the laptop. After successful authentication, the mobile telephone sends session keys to the laptop. The mobile telephone uses a standard SIM card or a universal integrated circuit card (UICC) to perform the computations required for EAP SIM or EAP AKA authentication. The protocols are implemented by software that is running in the mobile telephone. While Bluetooth is mentioned herein as an example connection between the laptop and mobile telephone, it should be understood that other connections types may be used such as RFID, WLAN, infrared, UWB or even cabled connections such as serial, parallel, or USB cables.

The present invention results in a number of advantages over conventional systems. Under the present invention, the Bluetooth SIM access profile can be used, and any smart card applications can be implemented by computer software. Additionally, operations do not have to deploy special smart cards with EAP support.

These and other objects, advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE INVENTION

Figure 1:
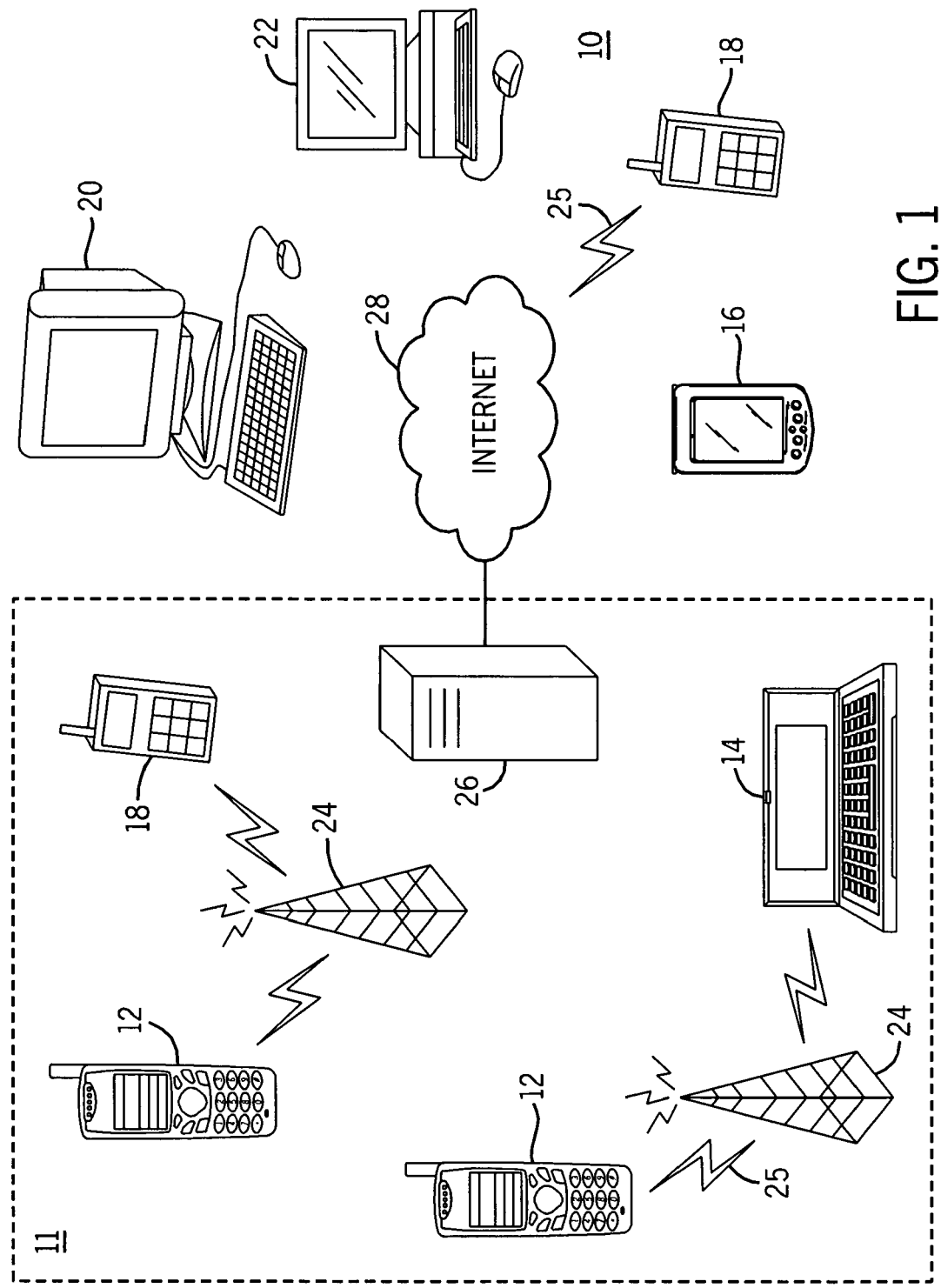
FIG. 1 is an overview diagram of a system according to an embodiment of the present invention.

The present invention involves the implementation of a proxy smart card application in the mobile telephone. FIG. 1 shows a system 10 in which the present invention can be utilized, comprising multiple communication devices that can communicate through a network. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 1 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary communication devices of system 10 may include, but are not limited to, a mobile telephone 12, a combination PDA and mobile telephone 14, a PDA 16, an integrated messaging device (IMD) 18, a desktop computer 20, and a notebook computer 22. The communication devices may be stationary or mobile as when carried by an individual who is moving. The communication devices may also be located in a mode of transportation including, but not limited to, an automobile, a truck, a taxi, a bus, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

Figure 2:
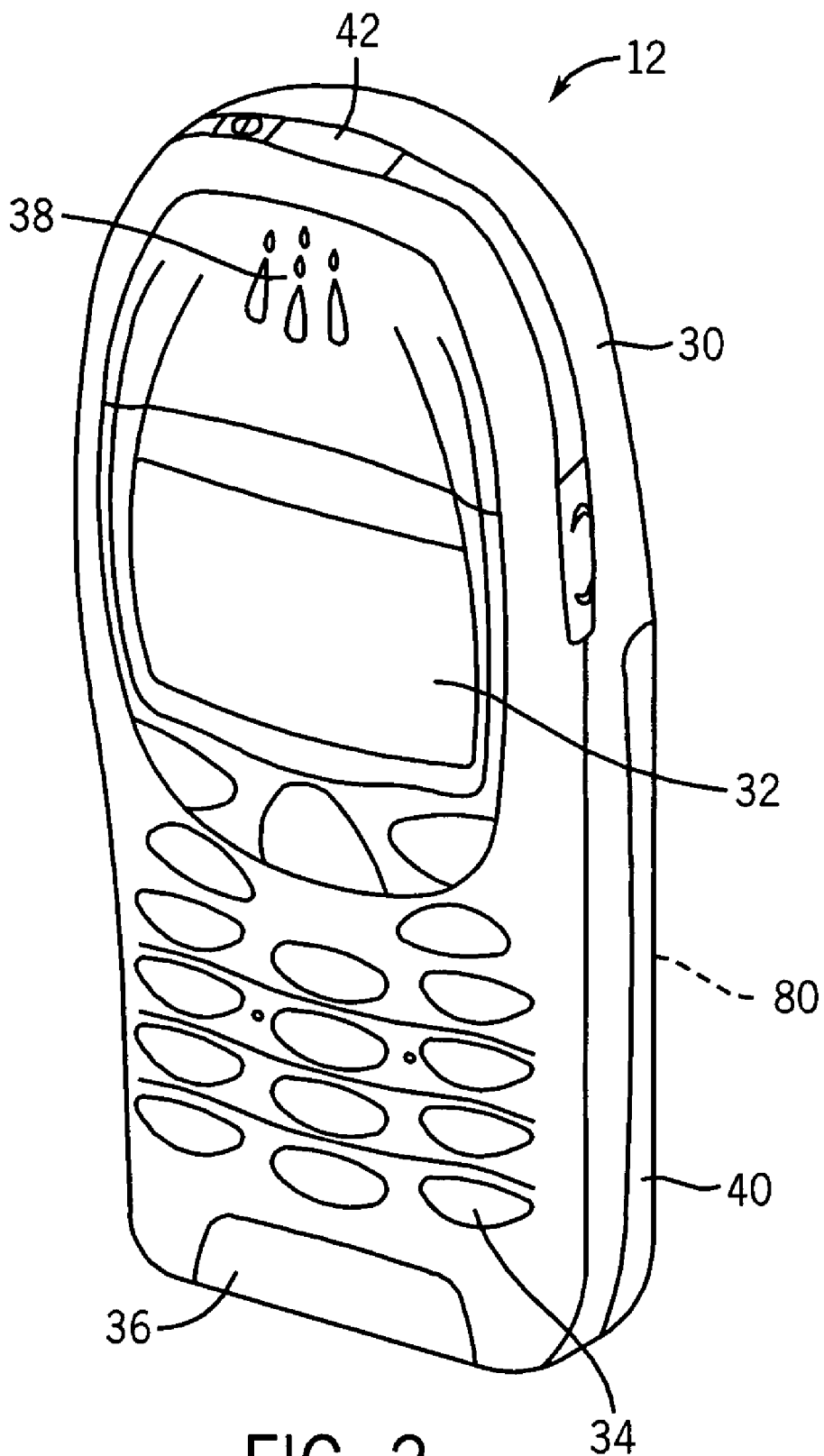
FIG. 2 is a perspective view of a mobile telephone that can be used in the implementation of the present invention.
Figure 3:
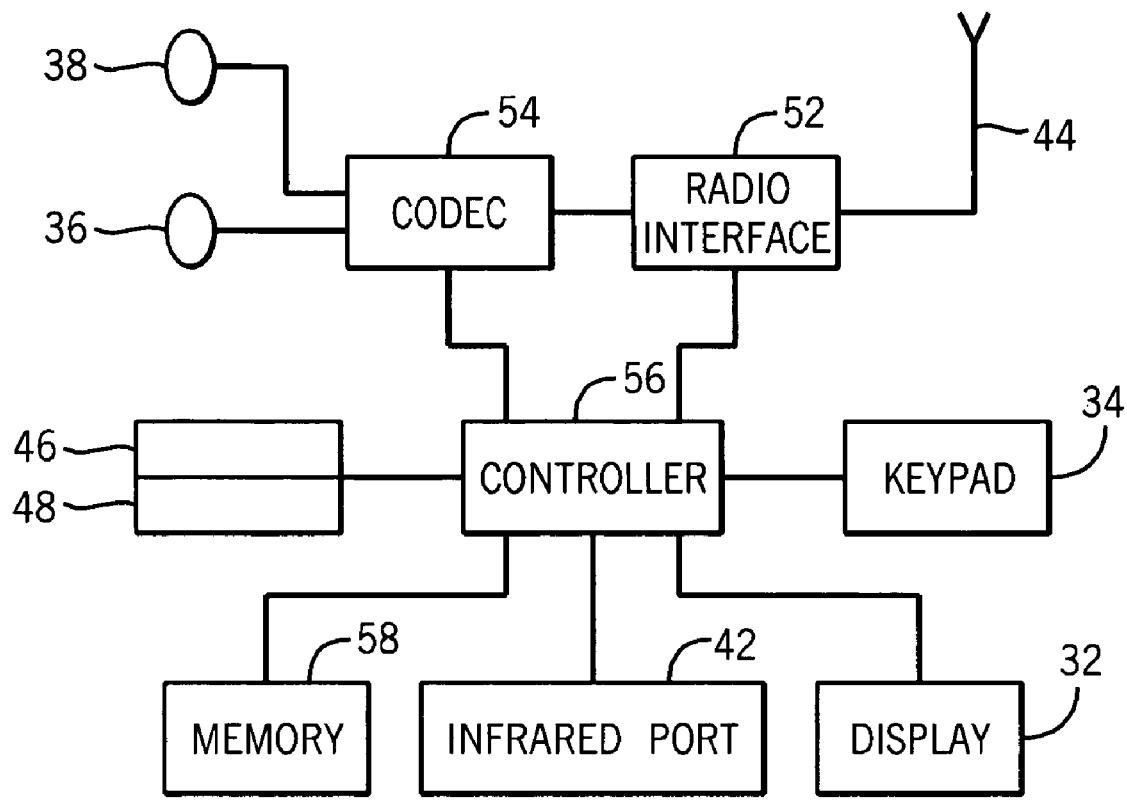
FIG. 3 is a schematic representation of the telephone circuitry of the mobile telephone of FIG. 2.

FIGS. 2 and 3 show one representative mobile telephone 12 according to one embodiment of the invention. It should be understood, however, that the present invention is not intended to be limited to one particular type of mobile telephone 12 or other electronic device. The mobile telephone 12 of FIGS. 2 and 3 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

Figure 4:
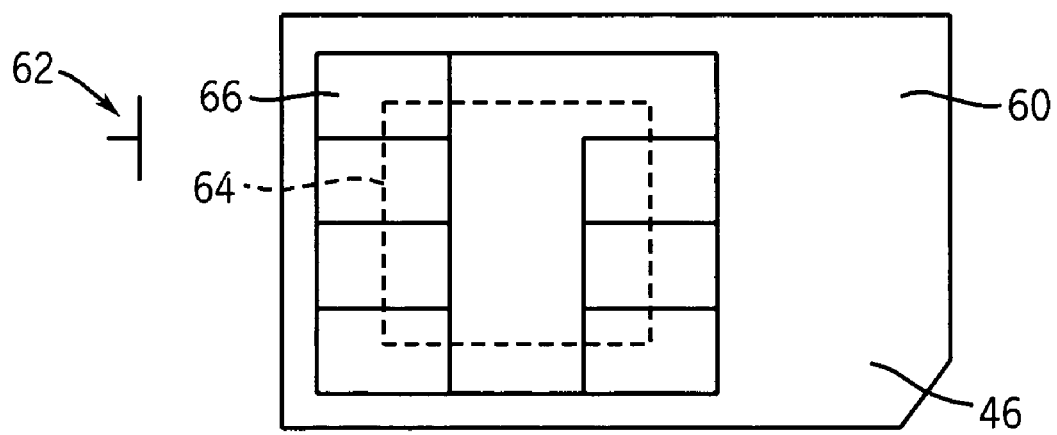
FIG. 4 is a schematic representation of the circuitry of the smart card represented in FIG. 3.
Figure 5:
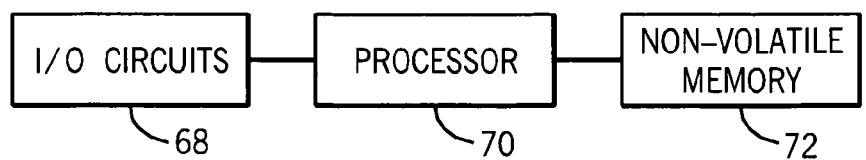
FIG. 5 is a schematic diagram of the memory structure held by the smart card of FIG. 3.

As shown in FIG. 4, the smart card 46 includes a plastic card body 60 and a module 62 which comprises an integrated circuit 64 and contacts 66. As represented in FIG. 5, the integrated circuit 64 comprises input/output circuits 68, a processor 70 and non-volatile memory 72.

Figure 6:
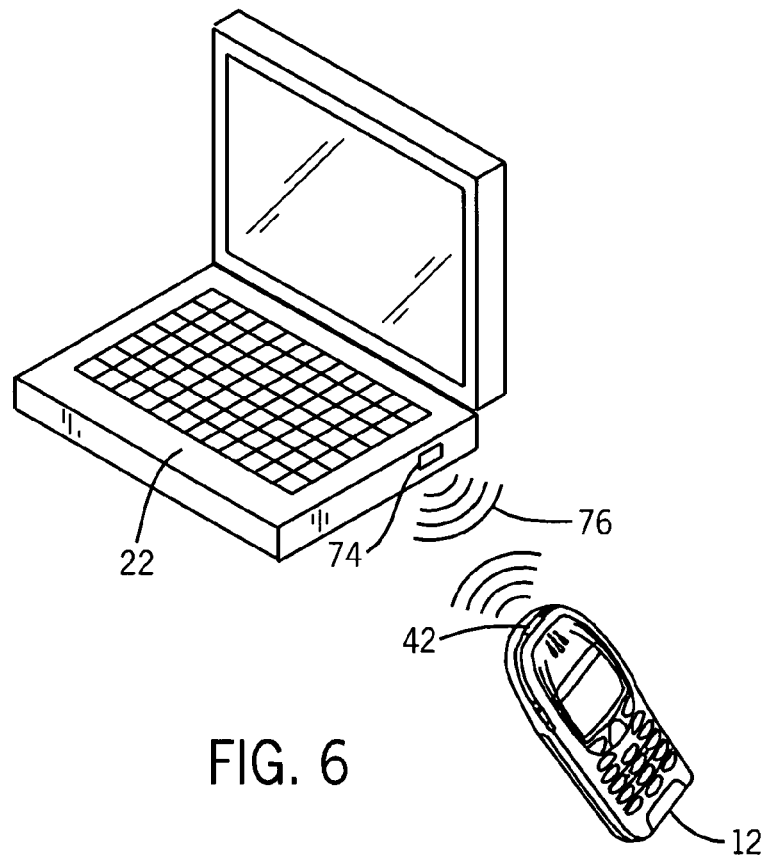
FIG. 6 shows a laptop computer with an infrared port exchanging information with the mobile telephone of FIG. 2.
Figure 8:
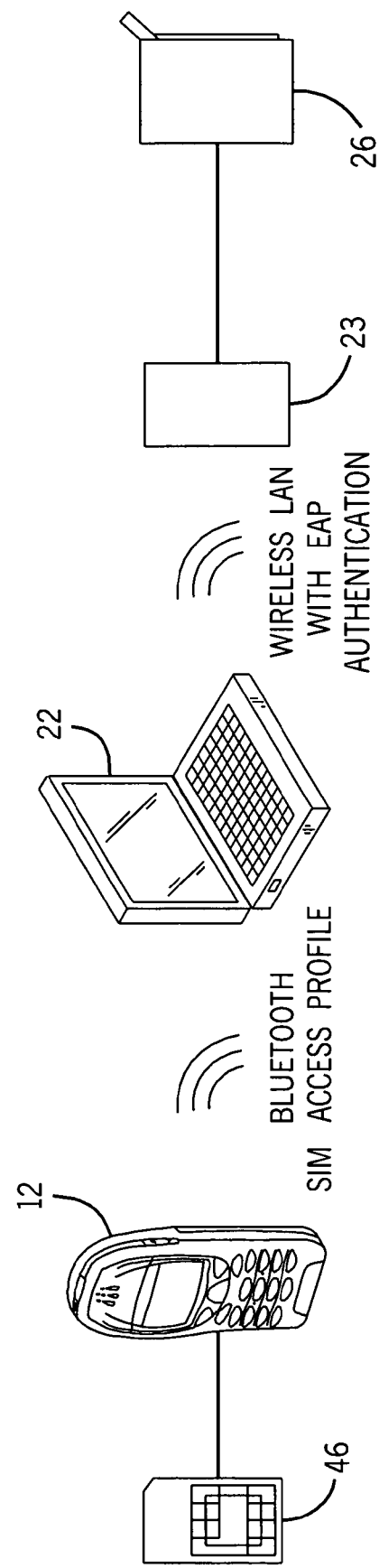
FIG. 8 is a schematic representation of a network system including a mobile phone with a smart card according the to the principles of the present invention.

Referring to FIG. 6, the mobile telephone 12 may exchange information with an external device such as a laptop computer 22 having a laptop infrared port 74 through an infrared link 76. FIG. 8 is a representation of the larger system, showing the communication stream among the mobile telephone 12 with smart card 46, the laptop computer 22, a wireless LAN access point 23, and the network authentication (EAP) server 26. In this situation, the smart card 46 can be a standard GSM SIM or 3G UICC smart card. In this situation, the laptop computer 22 passes through EAP packets between the mobile telephone 12 and the wireless LAN access point 23. The mobile telephone 22 intercepts APDUs that relate to EAP implementation. The mobile telephone 22 includes EAP-SIM and EAP-AKA peer implementations and use a standard GSM or UICC for peer implementation.

Figure 7:
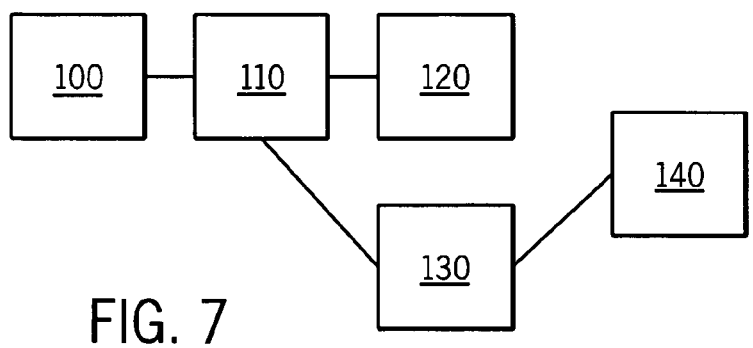
FIG. 7 is a flow chart showing the steps involved in the implementation of the present invention.

FIG. 7 shows the steps involved in the implementation of the present invention. The process begins at step 100 with the mobile telephone 12 receiving a message related to the smart card 46 over a Bluetooth connection. At step 110, the mobile telephone 12 determines whether the message (such as a command APDU) is related to a function that is implemented by computer software as a proxy smart card application. If the message is not related to a proxy smart card application software, represented at 80 in FIG. 2, then at step 120 the mobile telephone 12 transmits the message to the smart card 46 for processing. However, if the message is related to a function that is implemented by the smart card application software 80, then at step 130 the mobile telephone 12 does not send anything to the smart card 46. Instead, the message is processed by the smart card application software 80. The mobile telephone software also generates any required response messages at step 140. Although the mobile telephone 12 does not send the message to the smart card 46 for processing, the mobile telephone 12 may use the services of the smart card 46 while processing the message.

From the viewpoint of the laptop computer 22, it does not make any difference whether a function is implemented by an actual smart card 46 or by the smart card application software 80.

In the split user equipment scenario, the mobile telephone 12 processes all EAP SIM and EAP AKA related messages (APDUs) by software, but the mobile telephone 12 may forward other messages, such as generic SIM access messages, to the smart card 46. While processing the EAP SIM and EAP-AKA-related messages, the mobile telephone 12 uses the standard authentication primitives of the smart card 46.

While several embodiments have been shown and described herein, it should be understood that changes and modifications can be made to the invention without departing from the invention in its broader aspects. For example, but without limitation, the present invention can be used in conjunction with a variety of electronic devices. In addition, while exemplary embodiments disclose using a Bluetooth connection, other connection types may be used such as RFID, WLAN, infrared, UWB, serial cable connections, parallel cable connections, or USB cable connections to name a few. Various features of the invention are defined in the following Claims:

What is claimed is:

1. A method for providing smart card applications on an electronic device, comprising:
    receiving a smart card related message from a remote terminal;
    determining whether the smart card related message is related to a function implemented as a proxy smart card application by electronic device software;
    if the smart card related message is related to a function implemented as a proxy smart card application by the electronic device software, having the electronic device software process the message without communicating with the smart card; and
    if the smart card related message is not related to a function implemented as a proxy smart card application by the electronic device software, transmitting the message to the smart card.

2. The method of claim 1, wherein the message is received via a Bluetooth connection.

3. The method of claim 1, wherein the message is received via an RFID, WLAN, infrared, or UWB connection.

4. The method of claim 1, wherein the message is received via a serial, parallel, or USB cable connection.

5. The method of claim 1, wherein the message comprises a command application protocol data unit.

6. The method of claim 1, further comprising the step of generating a response message for transmittal to the remote terminal.

7. The method of claim 1, wherein the remote terminal comprises a laptop computer.

8. The method of claim 1, wherein the electronic device comprises a portable telephone.

9. A computer program product, embodied on a non-transitory computer-readable medium, for providing smart card applications on an electronic device, comprising:
    computer code for receiving a smart card related message from a remote terminal;
    computer code for determining whether the smart card related message is related to a function implemented as a proxy smart card application by electronic device software;
    computer code for, if the smart card related message is related to a function implemented as a proxy smart card application by the electronic device software, having the electronic device software process the message without communicating with the smart card; and
    computer code for, if the smart card related message is not related to a function implemented as a proxy smart card application by the electronic device software, transmitting the message to the smart card.

10. The computer program product of claim 9, wherein the message is received via a Bluetooth connection.

11. The computer program product of claim 9, wherein the message is received via an RFID, WLAN, infrared, or UWB connection.

12. The computer program product of claim 9, wherein the message is received via a serial, parallel, or USB cable connection.

13. The computer program product of claim 9, wherein the message comprises a command application protocol data unit.

14. The computer program product of claim 9, further comprising the step of generating a response message for transmittal to the remote terminal.

15. The computer program product of claim 9, wherein the remote terminal comprises a laptop computer.

16. The computer program product of claim 9, wherein the electronic device comprises a portable telephone.

17. An electronic device, comprising:
    a housing;
    a memory unit for storing electronic device software;
    a smart card operatively connected to the memory unit; and
    a data communication link for receiving smart-card related messages from a remote terminal,
    wherein if a smart card related message received by the electronic device is related to a function implemented as a proxy smart card application by the electronic device software, the electronic device software processes the message without communicating with the smart card, and wherein if a smart card related message received by the electronic device is not related to a function implemented as a proxy smart card application by the electronic device software, the message is transmitted to the smart card for processing.

18. The device of claim 17, wherein the electronic device comprises a portable telephone.

19. The device of claim 17, wherein the remote terminal comprises a laptop computer.

20. The device of claim 17, wherein the data communication link comprises a Bluetooth connection link.

21. The device of claim 17, wherein the message is received via an RFID, WLAN, infrared, or UWB connection link.

22. The device of claim 17, wherein the message is received via a serial, parallel, or USB cable connection link.

23. The device of claim 17, wherein the message comprises a command application protocol data unit.

24. The device of claim 17, wherein a response message is generated by the electronic device software for transmittal to the remote terminal.

25. The device of claim 17, wherein the smart card comprises a universal integrated circuit card.

26. A module for use in an electronic device, comprising:
    a memory unit for storing electronic device software;
    a smart card operatively connected to the memory unit; and
    a data communication link for receiving smart-card related messages from a remote terminal,
    wherein if a smart card related message received by the module is related to a function implemented as a proxy smart card application by the electronic device software, the electronic device software processes the message without communicating with the smart card, and wherein if a smart card related message received by the module is not related to a function implemented as a proxy smart card application by the electronic device software, the message is transmitted to the smart card for processing.

27. The module of claim 26, wherein the data communication link comprises a Bluetooth connection link.

28. The module of claim 26, wherein the message is received via an RFID, WLAN, infrared, or UWB connection link.

29. The module of claim 26, wherein the message is received via a serial, parallel, or USB cable connection link.

30. The module of claim 26, wherein the message comprises a command application protocol data unit.

31. The module of claim 26, wherein a response message is generated by the electronic device software for transmittal to the remote terminal.

32. The module of claim 26, wherein the smart card comprises a universal integrated circuit card.

33. A system for providing smart card applications, comprising:
   a remote terminal; and
   an electronic device including a memory unit for storing electronic device software, a smart card operatively connected to the memory unit, and a data communication link for receiving information from the remote terminal,
   wherein if a smart card related message received by the electronic device from the remote terminal is related to a function implemented as a proxy smart card application by the electronic device software, the electronic device software processes the message without communicating with the smart card, and wherein if a smart card related message received by the electronic device is not related to a function implemented as a proxy smart card application by the electronic device software, the message is transmitted to the smart card for processing.

34. The system of claim 33, wherein the data communication link comprises a Bluetooth connection link.

35. The system of claim 33, wherein the message is received via an RFID, WLAN, infrared, or UWB connection link.

36. The system of claim 33, wherein the message is received via a serial, parallel, or USB cable connection link.

37. The system of claim 33, wherein the message comprises a command application protocol data unit.

38. The system of claim 33, wherein a response message is generated by the electronic device software for transmittal to the remote terminal.

39. The system of claim 33, wherein the smart card comprises a universal integrated circuit card.

* * * * *